United States Patent [19]

Middleton

[11] 3,910,699
[45] Oct. 7, 1975

[54] SCAN CYCLING MECHANISM FOR COPIERS
[76] Inventor: Robert A. Middleton, 1544 Queens Place, Philadelphia, Pa. 19122
[22] Filed: Oct. 25, 1974
[21] Appl. No.: 518,106

[52] U.S. Cl. ........................ 355/66; 355/8; 355/49
[51] Int. Cl.² .................. G03G 15/28; G03B 27/50
[58] Field of Search ............... 355/8, 65, 66, 81, 84, 355/49

[56] References Cited
UNITED STATES PATENTS

| | | | |
|---|---|---|---|
| 3,614,222 | 10/1971 | Post et al. | 355/66 X |
| 3,825,339 | 7/1974 | Ogawa | 355/8 X |
| 3,867,026 | 2/1975 | Ogawa | 355/8 |
| 3,871,766 | 3/1975 | Inoue | 355/8 X |

FOREIGN PATENTS OR APPLICATIONS 6,512,049  4/1966  Netherlands........................ 355/66

*Primary Examiner*—Robert P. Greiner
*Attorney, Agent, or Firm*—Griffin, Branigan and Butler

[57] ABSTRACT

In a scan system copy plane a photocopier, and endless cable mounted on two, spaced pulleys carrying pins, each of which engages a spring biased arm mounted on a carriage carrying lights and a first mirror. A second carriage with two mirrors is mounted through a pulley to the first carriage for parallel movement at one-half speed. Images from a copyplane are reflected through the three mirrors, then through a lens to a photosensitive surface. The pin comes around one pulley to engage the arm and remains engaged until the pin moves around the second pulley after traveling through a straight section or reach. An arm with a pin for blocking movement of the first carriage is initially positioned to hold the carriage from moving past a pre-determined starting position. During carriage scan movement the arm is rotated one and one-half times so that the pin is immediately behind the first carriage as the scan ends and controls the return movement under the drive of a return spring. In the system all movements are initiated and terminated sinusoidally.

4 Claims, 5 Drawing Figures

SCAN CYCLING MECHANISM FOR COPIERS

BACKGROUND OF THE INVENTION

Scanning optical systems are conventional in various forms in prior art photocopier systems. In a typical system a carriage holding lights and at least one mirror moves under a transparent surface. The original document to be copied is placed on the surface and the light is concentrated on all sections of it as the light scans the surface. The portion so illuminated is transferred by the mirror to other parts of the optical system and ultimately directed to a photosensitive surface.

Since physically substantial elements are moved in such a system, impulse reactions are experienced, causing corresponding wear and physical stresses within the parts. Most importantly, elimination of impulses in such a system facilitates the use of multiple scans, since the original is not displaced from jarring during the multiple operations. A multiple scan design, in turn, permits size reduction of the entire copier.

It is, accordingly, an object of this invention to minimize physical impulses in a movable optical observation system.

Similarly, it is an object of this invention to provide for gradual acceleration and deceleration of the carriages of the optical system of a photocopier.

It is another, more specific object of this invention to provide for gradual or sinusoidal movement of the carriages of an optical system under the drive of a constant speed source.

The light source and three-mirror optical sweep system and general manner of drive employed with this invention are entirely known. The contribution of this invention is considered to be in the drive mechanism for both optical scan and return.

SUMMARY OF THE INVENTION

The scan drive comprises a cable carrying at least one pin. The cable is driven around two, spaced pulleys. Just as the cable moves around one of the pulleys, it engages a recess in a pivoted arm attached to the carriage upon which the light source and first mirror are mounted. As the arm pivots and is pulled outward, acceleration in the outward direction is sinusoidal. At the same time, a return-control arm, having a pin which physically blocks the back of the first carriage, is rotated at a rate of one and one-half turns in the interval of outward movement of the first carriage. The pin is thereby positioned behind the carriage when the scan movement is terminated and controls backward velocity as the return-control arm continues to rotate at the previous velocity.

Other objects, features, characteristics, and advantages of the invention will be apparent after reference to the following description of the preferred embodiment of the invention, as illustrated by the accompanying drawings.

DESCRIPTION OF THE PREFERRED EMBODIMENT

Figure 1:
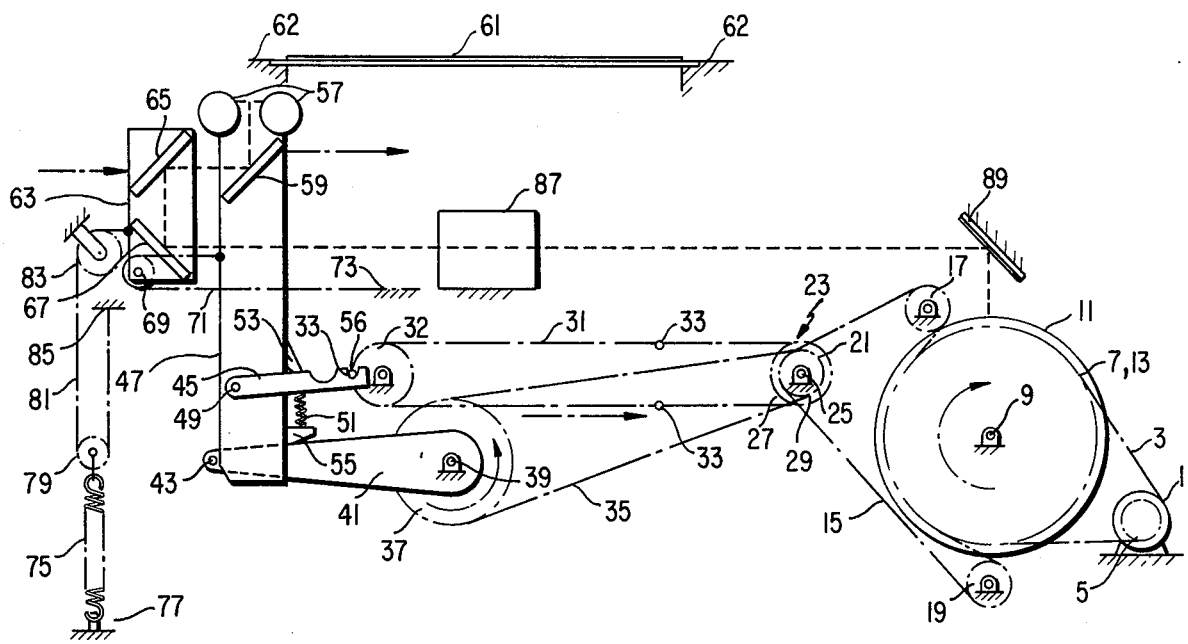
FIG. 1 illustrates the mechanism in the starting position.

Referring to FIG. 1, which illustrates the significant elements in the starting or rest position, motive power is supplied by a motor 1. A chain or toothed timing belt 3 transfers rotary power from a sprocket or toothed pulley 5 on the shaft of motor 1 to a pulley or sprocket 7 mounted on a shaft 9. Mounted for rotation on the shaft 9 is a conventional cylindrical drum 11, which is surfaced with photoconductive material. A second sprocket 13 of the same diameter as sprocket 7 is located generally beside sprocket 7 on shaft 9.

Chain 15 meshes with sprocket 13 and meshes with a tension idler sprocket 17 and an idler sprocket 19. Chain 15 also engages a sprocket 21, which is attached as the input drive to a clutch 23. Clutch 23 rotates on axis 25. Sprockets 27 and 29 are secured to the output side of clutch 23. A chain or belt 31 is mounted on sprocket 27 and spaced horizontally therefrom so that the outer sides of sprockets 27 and 32 are the same distance apart as the desired horizontal sweep of the light in the scanning system.

Mounted on the chain 31 are three pins 33, equally spaced along the length of chain 31, and extending from the side of the chain 31.

Chain or cable 35 engages clutch sprocket 29 and a further sprocket 37, which is journaled on axis 39, spaced horizontally and somewhat down from sprocket 29. Sprocket 37 is considerably larger in circumference than sprocket 29. Return-control arm 41, carrying at its end abutment roller 43, is attached to sprocket 37 or axis 39.

Scan arm 45 is attached at pivot pin 49 to the first, or light-source carrying carriage 47. Spring 51 biases arm 45 upwardly into upper-limit stop member 53, which is mounted on carriage 47. Spring 51 rests on platform 55, which is mounted on carriage 47. Arm 45 has a notch or recess 56 (best seen in FIG. 5) which will receive the pins 33.

Carriage 47 supports document illuminating lamps 57, and an initial or first image receiving mirror 59, which is positioned at a 45° angle to the right from the vertical. A transparent plate 61 for receiving documents to be copied is mounted at its sides to frame 62 immediately above lamps 57.

A second carriage 63 carries a top, second mirror 65 at 45° from the vertical to receive the image from mirror 59 and direct that image downwardly to a bottom, third mirror 67. Mirror 67 is at 45° from the vertical so as to direct the image horizontally.

Idler pulley 69 is attached to carriage 63. A cable 71 is attached to carriage 47, extends horizontally to pass around pulley 69 and extend horizontally to an anchor 73 on the stationary frame.

A return spring 75 extends vertically so that one end is attached at a low point of the frame at 77. The other end of spring 75 is attached to floating pulley 79. A cable 81 is attached to second carriage 63, passes around pulley 83, which is anchored to the frame, then extends vertically, then around pulley 79, and then vertically to attachment to the frame at 85.

Documents and the like to be copied are placed image down on transparent plate 61. A stationary lens 87 receives images from third mirror 67, focuses the images and directs them to a mirror 89 attached to the frame, which directs them downwardly onto the photosensitive surface of drum 11.

The numerical order of the drawings illustrates in sequence the various phases of operation of the invention. FIG. 1 illustrates the carriages 47 and 63 in the start or home position, with carriage 47 being held against further leftward movement by roller pin 43 on the end of return-control arm 41. A pin 33 on cable 31 has just entered recess 56.

Assuming that the clutch 23 is engaged so that the cable 31 is being driven, further movement of cable 31 will move arm 45 downwardly and gradually rightwardly.

Other modes of FIG. 1 are simply the off mode, where all elements are dormant and at rest in the positions shown and the on, not-copy mode, in which motor 1 is active, but clutch 23 is not engaged.

Figure 2:
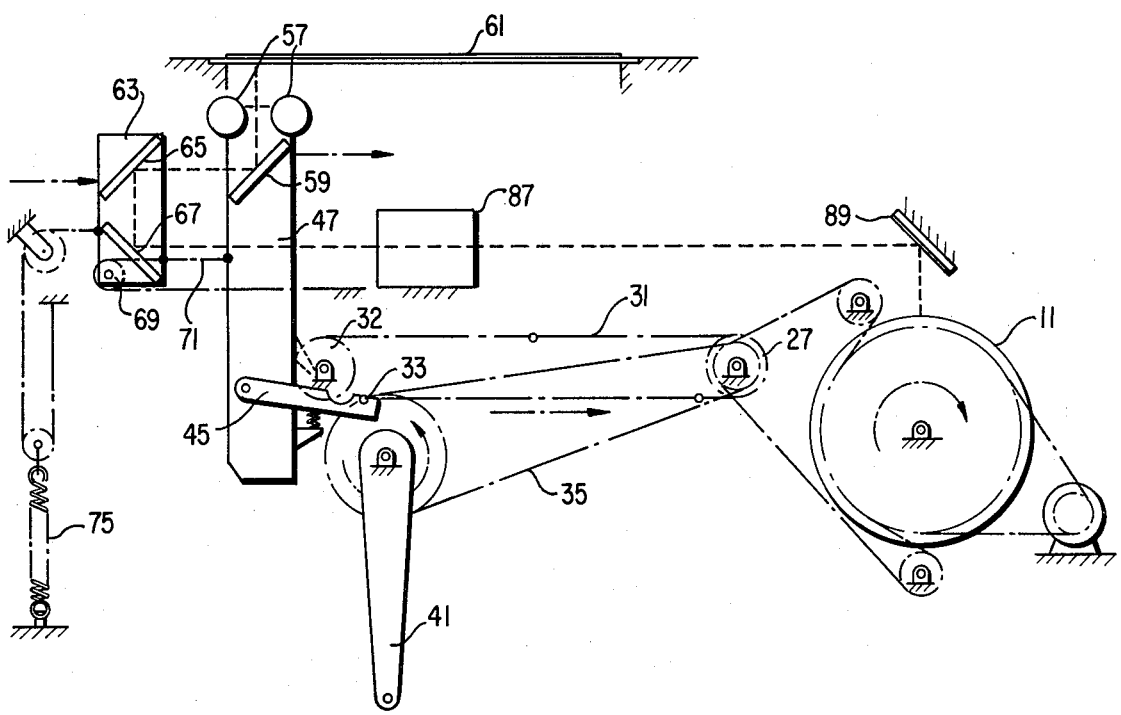
FIG. 2 illustrates the mechanism in the position shortly into a scan cycle.

FIG. 2 illustrates the copy mode at approximately one-sixth of a scan cycle. Arm 45 has been rotated downwardly and accelerated sinusoidally in the horizontal direction as pin 33 on cable 31 moved around pulley 32. In the FIG. 2 position, arm 45 is moving at a constant velocity across the straight or reach section between sprockets 27 and 32.

Return control arm 41, driven by chain 35 has rotated downwardly one quarter revolution.

Pulley 69, together with cable 71, introduces a speed reduction so that carriage 63 moves horizontally in the same manner as carriage 47, but at one-half the speed. Lights 57 are brought into close proximity with sections of any document on the outer plane 61, and the illuminated portions are directed by mirror 59 to mirror 65, then to mirror 67, through lens 87, then to mirror 89 and from mirror 89 to the photosensitive surface on drum 11. Image reproduction from drum 11 may be by conventional process. Return spring 75 is extended by the movement of carriage 63.

Figure 3:
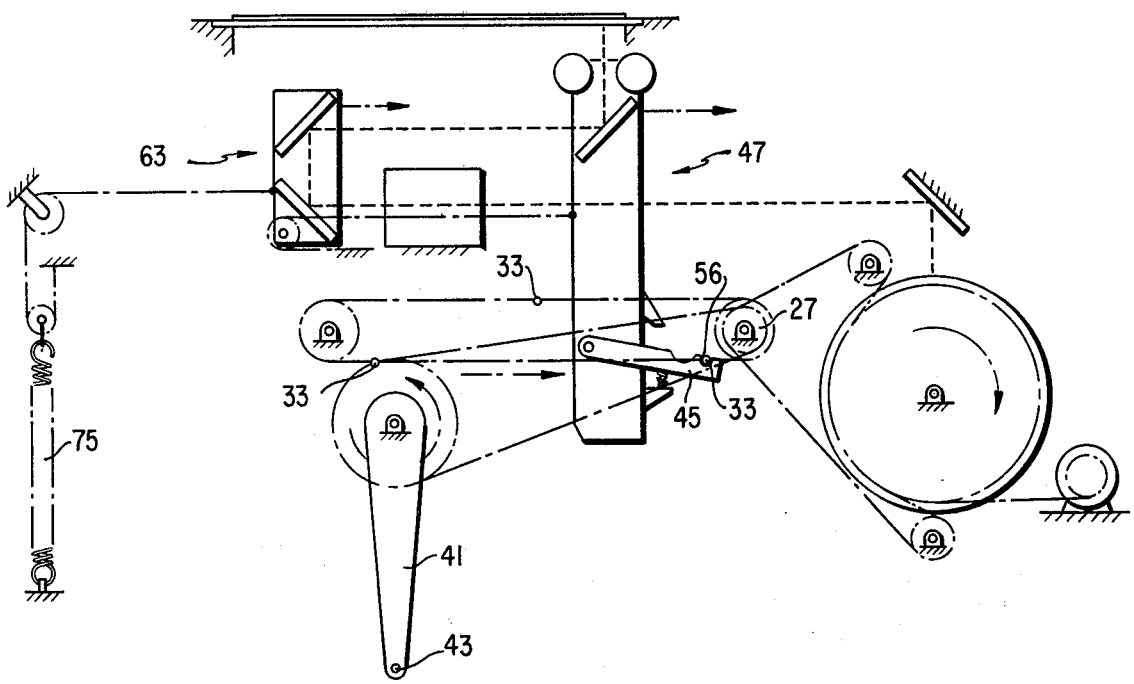
FIG. 3 illustrates the mechanism shortly before the end of a linear sweep.

FIG. 3 illustrates the copy mode at approximately five-sixths of a scan cycle. The carriages 47 and 63 have continued to be moved at a constant velocity with any document on plate 61 scanned and images transferred as described in connection with FIG. 2. Carriage 63 has again moved one-half as far as carriage 47. Return spring 75 has been further extended. Return arm 41 has rotated one and one-quarter turns.

Figure 4:
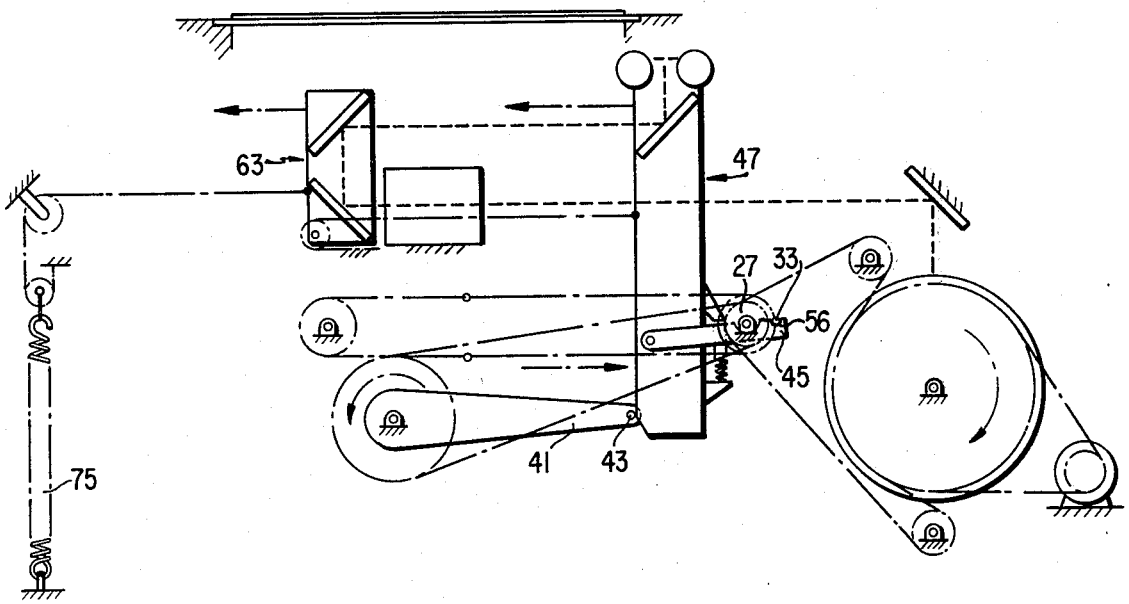
FIG. 4 illustrates the mechanism at the end of a linear sweep.

FIG. 4 illustrates the copy mode just at the end of a copy scan. The carriage movement was slowed sinusoidally as pin 33 rotated upward around sprocket 27. Pin 33 is about to move upward out of recess 56 in arm 45 to thereby free the carriages 47 and 63 for return movement. Return arm 41 has rotated another one-quarter turn, thereby placing roller pin 43 in contact with carriage 47, so that pin 43 will hold the carriages 47 and 63 against impulse movement generated by return spring 75.

Arm 41 continues to rotate at the same velocity as previously, thereby moving pin 43 upward and backward, and permitting carriage 47 to accelerate leftward sinusoidally, under the drive of spring 75.

Figure 5:
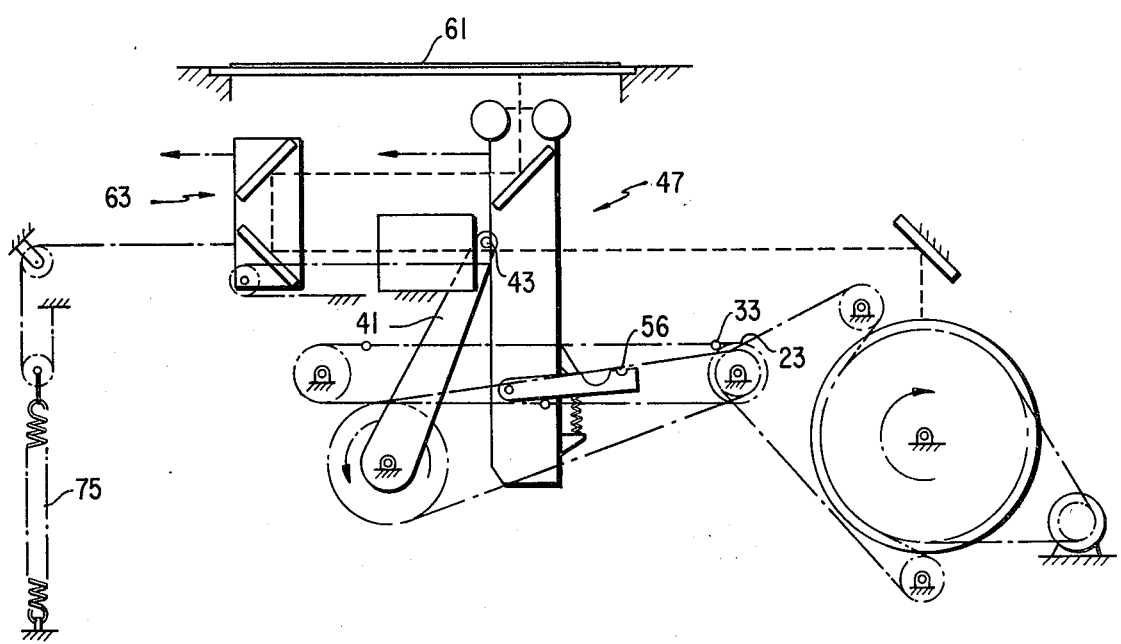
FIG. 5 illustrates the mechanism in the center of the return movement.

FIG. 5 illustrates the return movement of carriages 47 and 63 at an intermediate point. None of the pins 33 is engaged with the recess 56. Roller pin 43 is approaching its highest position, at which horizontal velocity is the greatest. Subsequently, as roller 43 approaches the left side, it begins to move predominantly downwardly and thereby slows the return movement of carriages 47 and 63 sinusoidally. Recycling will occur so long as clutch 23 is engaged. All acceleration and deceleration is sinusoidal, thereby preventing jarring within the system and, in particular, the movement of a copy on plane 61 during successive copy scans. Return of the carriages is at relatively high speed.

It will be apparent that this invention may take various forms falling within the spirit and scope of the invention as defined by the appended claims.

I claim:

1. In an optical scan system comprising a first carriage movable across a transparent plane supporting a light source and a first mirror, a second carriage supporting a second mirror and a third mirror, said carriages being connected to a common drive means such that said carriages move in the same direction with said first carriage moving at twice the velocity of said second carriage, a lens focused on a photoresponsive surface, said mirrors being positioned on said carriages such that images from said transparent plane are directed from said first mirror to said second mirror to said third mirror to said lens, the improvement wherein said drive means comprises a cable carrying at least one extending pin and mounted for endless movement around two, spaced pulleys to form a straight reach, and an arm pivotally connected to said first carriage and spring biased toward the incoming direction of said pin when it moves over one of said pulleys, said arm having a recess adapted to become engaged when said pin enters said recess as said pin begins to move in the direction of said reach, the cable then carrying said first carriage the length of the reach and until said pin moves out of said recess as it moves over the other of said pulleys.

2. The optical system as in claim 1 wherein said carriages are spring biased to the starting position and also comprising an arm with a pin located to contact said first carriage to hold it from moving on return past a predetermined starting position, said arm being connected to drive means to rotate one and one-half times as said first carriage is moved from said starting position to the end of said movement under the drive from the said cable and being adapted when so rotated to contact said carriage with said pin and to continue said rotation with said pin in contact to control the speed of return to said starting position under the action of said spring bias.

3. The optical scan system as in claim 1 in which said cable carries at least two said pins at locations equally spaced from one another along the length of said cable.

4. The optical scan system as in claim 2 in which said cable carries at least two said pins at locations equally spaced from one another along the length of said cable.

* * * * *